United States Patent Office 3,483,235
Patented Dec. 9, 1969

3,483,235
NEW OESTRATRIENES AND PROCESS FOR THEIR MANUFACTURE
Oskar Jeger, Zollikerberg, Zurich, Kurt Schaffner, Zurich, and Hans Ueli Wehrli, Schaffhausen, Switzerland, assignors to Ciba Corporation, New York, N.Y., a corporation of Delaware
No Drawing. Filed Jan. 23, 1967, Ser. No. 610,742
Claims priority, application Switzerland, Feb. 4, 1966, 1,606/66
Int. Cl. C07c 169/10, 167/14; A61k 27/00
U.S. Cl. 260—397.4
9 Claims

ABSTRACT OF THE DISCLOSURE

New compounds of the formula

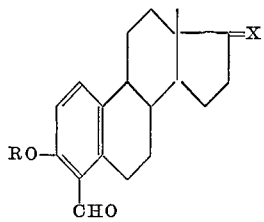

RO=free, esterified or etherified hydroxyl group,
X=any one of the substituents occurring in the 1-position of steroids, for example: 3-hydroxy-4-formyl-17β-acetoxy-$\Delta^{1,3,5(10)}$-oestratriene,
use: as agents lowering the cholesterol level, as oestrogenic agents,
and a process of their preparation which consists in treating 3-oxo-4-lower alkanoyloxy-methylene-$\Delta^{5(10)}$-19-norsteriods with a dehydrating agent.

BACKGROUND OF THE INVENTION

The invention concerns new 3-hydroxy-4-formyl-$\Delta^{1,3,5(10)}$-oestratrienes and a process of their preparation, which have not been heretofore disclosed in the literature.

The present invention provides new oestratrienes, especially of 3-hydroxy-4-formyl-$\Delta^{1,3,5(10)}$-oestratrienes of the general formula (I)

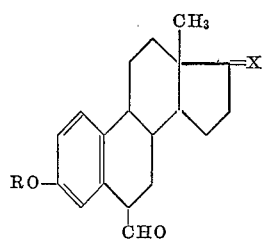

in which RO represents a free, esterified or etherfied hydroxyl group and X any one of the substituents occurring in the 17-position of steroids, as well as a process for their manufacture.

The above-mentioned compounds possess valuable pharmacological properties. Inter alia, they lower the cholesterol level and have an oestrogenic action. They may be used, for example, for treating arteriosclerosis or menopausal deficiency conditions. They are also valuable intermediates for the manufacture of known, biologically active steroids, for example of corresponding 4-alkyl-steroids.

Particularly valuable are compounds of the formulae

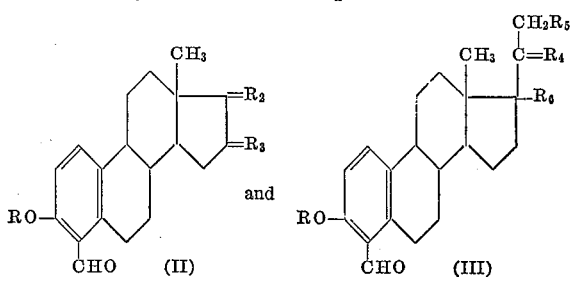

in which RO has the above meaning, $R_2$ represents an oxo group or a free, esterified or etherified β-positioned hydroxyl group and a hydrogen atom or a lower aliphatic hydrocarbon radical, $R_3$ represents two hydrogen atoms, or a hydrogen atom together with a lower alkyl radical or a free, esterified or etherified hydroxyl group, or a methylene group, $R_4$ represents a free or ketalized oxo group or a hydrogen atom together with a free, esterified or etherified hydroxyl group, and $R_5$ and $R_6$ each represents a hydrogen atom or a free esterified or etherified hydroxyl group. $R_4+R_5+R_6$ may also form a bis-alkylenedioxy grouping.

Particularly valuable biological properties are found in those compounds of the Formula II, in which R represents a hydrogen atom or a lower alkyl or aliphatic carboxylic acid radical and $R_2$ a keto group or a free hydroxyl group or a hydroxyl group esterified with a lower aliphatic carboxylic acid together with a hydrogen atom or with a lower alkyl such as methyl or ethyl radical, a lower alkenyl such as vinyl, allyl or methallyl radical, or with a lower alkinyl such as ethinyl or propinyl radical. The following compounds deserve special mention.

3,17 dihydroxy-4-formyl-$\Delta^{1,3,5}$-oestratriene and its esters and ethers, for example its 3-methyl ether and/or 17-lower alkanoyl esters or ethers, such as tetrahydropyranyl, tetrahydrofuranyl and cyclopentyl ether.

The acid radicals in the above-mentioned esters are especially those of aliphatic, cycloaliphatic, araliphatic, aromatic or heterocyclic carboxylic acids containing 1 to 15 carbon atoms, for example formates, acetates, propionates, butyrates, trimethylacetates, caproates, valerates, decanoates, cyclopentylpropionates, tetrahydrobenzoates, phenylpropionates, benzoates, furoates, trichloroacetates, ethylcarbonates or methylcarbonates.

A possibly obtained 4-formyloestratriene that contains in position 17 the side chain of the cholane, cholestane, spirostane or cardanolide series, may be converted—if desired or required with simultaneous protection of the formyl group—by a known method into the pharmacologically highly active androstane or pregnane derivatives, for example by acylolysis, oxidation and/or microbiological means.

The new pharmacologically active compounds may be used as medicaments in human and veterinary medicine, for example in the form of pharmaceutical preparations containing the new compounds in conjunction or admixture with an organic or inorganic, solid or liquid excipient suitable for enteral (for example oral), parenteral or local administration. Suitable excipients are substances that do not react with the new compounds, for example water, gelatin, lactose, starches, magnesium stearate, talcum, vegetable oils, benzyl alcohols, gums, polyalkyleneglycols, white petroleum jelly, cholesterol or other known medicinal excipients. The pharmaceutical preparations may be in solid form, for example, tablets, dragees or capsules, or in liquid or semi-liquid form solutions, suspensions, emulsions, ointments or creams. These pharmaceutical preparation may be sterilized and/or contain auxiliaries such as preserving, stabilizing, wetting or emulsifying agents, salts for regulating the osmotic pressure or buffers. They may also contain other therapeutically useful substances. They are formulated in the known manner.

The new compounds are obtained when 3-oxo-4-lower alkanoyloxy-methylene-$\Delta^{5(10)}$-19-norsteroids of the partial formula

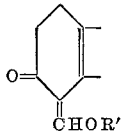

which R' represents a lower alkanecarboxylic acid radical — are treated with a dehydrating agent and, if desired, in a resulting 3-hydroxy-4-formyl-$\Delta^{1,3,5}$-oestratriene acetal groups present are liberated, ether or ester groups present are hydrolyzed to free hydroxyl groups and/or free hydroxyl groups present are esterified, etherified or oxidized.

The 3-oxo-4-lower alkanoyloxy-methylene-$\Delta^{5(10)}$-steroids used as starting materials are new and can be manufactured, for example, as described in our patent application No. 610,743, filed Jan. 23, 1967 by irradiating a 3,19 dioxo-$\Delta^4$-steroid, isolating the 3-oxo-4-formyl-$\Delta^{5(10)}$-steroid from the reaction medium, for example by chromatography, and esterifying it with a lower carboxylic acid, for example its anhydride or halide.

The dehydration according to the present process can be achieved in known manner with a dehydrating agent, such as chloranil, dichlorodicyanobenzoquinone, selenium oxide or microbiologically, for example with the use of *Norcarradia corollina*, or in the first place with air or oxygen. The last-mentioned preferred dehydration is advantageously performed in an organic solvent, for example in an aliphatic and/or cycloaliphatic hydrocarbon, such as pentane, hexane, cyclohexane or methylcyclohexane, in an aliphatic or cyclic ether such as diethyl ether or dioxan, or preferably in a lower carboxylic acid such as glacial acetic acid, or in an alcohol, for example in ethanol. According to the variant chosen, the acyl radical is eliminated spontaneously during the reaction or after processing.

Any ester or protective groups present in the resulting products, such as ketals, may be split hydrolytically, and free hydroxyl groups may be oxidized to oxo groups. On the other hand, process products that contain free hydroxyl groups may be converted in known manner into their esters or ethers, for example by acylation with a carboxylic acid anhydride or halide.

The 3-oxo-4-lower alkanoyloxy-methylene-$\Delta^{5(10)}$-19-nor-steroids used as starting materials belong preferably to the androstane, pregnane, cholane, cholestane, spirostane, furostane or cardanolide series and may contain in addition to the groupings mentioned above further substituents such as alkyl (for example methyl) groups, halogen atoms, functionally modified oxo groups and/or free, esterified or etherfied hydroxyl groups. They may also contain further double bonds, especially in the 6,7-position. Particularly important starting materials are, for example 3,17-dioxo-4-hydroxymethylene-$\Delta^{5(10)}$-19-nor-androstene, 3-oxo-4-hydroxymethylene-17$\beta$-hydroxy-$\Delta^{5(10)}$-19-nor-androstene, 3-oxo-4-hydroxymethylene-17$\beta$-hydroxy-17$\alpha$-methyl-, 17$\alpha$-ethyl-, 17$\alpha$-vinyl-, 17$\alpha$-alkyl and -17$\alpha$-ethinyl-$\Delta^{5(10)}$-19-nor-androstene and their esters; also 3,20-dioxo-4-hydroxymethylene-$\Delta^{5(10)}$-nor-pregnene and its esters, 3,20-dioxo-4-hydroxymethylene-17$\alpha$,21-dihydroxy-$\Delta^{5(10)}$-19-nor-pregnene and its esters and 3-oxo-4-hydroxymethylene-$\Delta^{5(10)}$-19-nor-cholestene and its esters.

The following example illustrates the present process.

EXAMPLE

Air is injected for 12 hours into a boiling solution of 100 mg. of 3-oxo-4-acetoxymethyl-17$\beta$-acetoxy-$\Delta^{5(10)}$-19-nor-androstene in 100 ml. of glacial acetic acid. The batch is then evaporated under vacuum and the residue chromatographed in a 4:1-solution benzene+ethyl acetate on silica. The eluates are evaporated and the residue is recrystallized 3 times from acetone+petroleum ether, to yield 52 mg. of 3-hydroxy-4-formyl-17$\beta$-acetoxy-$\Delta^{1,3,5(10)}$-oestratriene melting at 196 to 198° C. Optical rotation $[\alpha]_D = +60°$ (c.=0.46). Infrared absorption spectrum: bands at 1725, 1640, 1605 and 1250 cm.$^{-1}$.

The starting material used in this example may be prepared, for instance, as follows:

A solution of 11.8 g. of 3,17-dioxo-19-hydroxy-$\Delta^4$-androstene in 150 ml. of tetrahydrofuran is stirred at 20° C. into a solution of 11.8 g. of lithium-aluminum tritertiary butoxyhydride in 100 ml. of tetrahydrofuran. The mixture is stirred for 45 minutes at 20° C., then mixed with aqueous glacial acetic acid of 5% strength, diluted with ethyl acetate and worked up in the usual manner. The resulting crude product is acetylated in 250 ml. of a 1:1-mixture of acetic anhydride and pyridine overnight at room temperature. The crude product obtained on evaporation is filtered with methylene-chloride through neutral alumina (activity III) and the evaporated eluated then recrystallized from acetone+petroleum ether, to yield 7.2 g. of 3-oxo-17$\beta$,19-diacetoxy-$\Delta^4$-androstene melting at 97 to 100° C. Optical rotation $[\alpha]_D = +135°$ (c.=0.51). Infrared bands at 1725, 1675, 1623 and 1255 cm.$^{-1}$.

2 grams of the above diacetate are hydrolyzed in 450 ml. of aqueous methanol of 90% strength with 1.2 mol equivalents of sodium bicarbonate for one hour at the boil. Water is added until crystallization sets in, after cooling the crystals formed are suctioned off, washed with much water, dried and recrystallized from acetone+petroleum ether, to yield 1.6 g. of 3-oxo-17$\beta$-acetoxy-19-hydroxy-$\Delta^4$-androstene melting at 162 to 163° C. Optical rotation $[\alpha]_D = +76°$ (c.=0.90). Infrared bands at 3600, 1725, 1675, 1623 and 1255 cm.$^{-1}$.

5 grams of the compound obtained in this manner in 75 ml. of dimethylformamide are mixed with 6.1 ml. of 8 N-chromic acid in 8 N-aqueous sulfuric acid and heated for 4½ hours at 40° C. An aqueous solution of 1% of sodium sulfate is added until crystallization sets in. The produce is filtered off, the crystals are washed with water and dried. On recrystallization from acetone+petroleum ether there are obtained 4.0 g. of 3,19-dioxo-17$\beta$-acetoxy-$\Delta^4$-androstene melting at 131 to 132° C. Optical rotation $[\alpha]_D = +143°$ (c.=0.68). Infrared bands at 2800, 1725, 1675, 1622 and 1255 cm.$^{-1}$.

3 grams of 3,19-dioxo-17-acetoxy-$\Delta^4$-androstene are dissolved in 150 ml. of ethanol and irradiated with a mercury vapour low-pressure burner in a quartz vessel at room temperature under nitrogen for 5 hours. The reaction mixture is then evaporated under vacuum, the residue dissolved in ether and the ethereal solution is washed with N-aqueous sodium hydroxide solution. The ethereal solution is evaporated and the residue chromatographed in a 4:1-solution of benzene+ethyl acetate on silica gel. There are at first obtained 580 mg. of 19-nor-testosterone acetate which after one crystallization from acetone+petroleum ether melts at 124° C. Mixed melting point, infrared spectrum and thin-layer chromatogram are identical with those of a 19-nor-testosterone acetate obtained by a different route. (According to the thin-layer chromatogram of the primary reaction solution, however, the primarily formed product is 3-oxo-17$\beta$-acetoxy-$\Delta^{5(10)}$-oestrene which is isomerized during the working up.)

Subsequent 4:1 benzene+ethyl acetate fractions consist of 620 mg. of unreacted starting material. Finally, 725 mg. of 3-oxo-5$\beta$-formyl-17$\beta$-acetoxy-4$\alpha$,10$\alpha$-cyclo-19-nor-androstane are eluted; after two recrystallizations from acetone+petroleum ether it melts at 135° C. Optical rotation $[\alpha]_D = +60°$ (c.=0.32). Infrared bands at 2720, 1725 and 1250 cm.$^{-1}$.

The basic washing is acidified, extracted with ether and the ether is evaporated, to yield 0.6 g. of a mixture of 3-oxo-4-formyl-17β-acetoxy-$\Delta^{5(10)}$-androstene with its isomeric 4-hydroxymethylene compound. The mixture is acetylated overnight at room temperature in 100 ml. of a 1:1-solution of acetic anhydride and pyridine. The reaction solution is evaporated under vacuum and the residue chromatographed in a benzene+ethyl acetate 4:1-solution on silica gel, to yield 470 mg. of 3-oxo-4-acetoxymethylene-17β-acetoxy-$\Delta^{5(10)}$-19-norandrostene which, after two crystallizations from acetone+petroleum ether, melts at 152 to 155° C. Optical rotation $[\alpha]_D = +228°$ (c.=0.56). Infrared bands at 1765, 1725, 1695, 1620, 1590, 1250 and 1175 cm.$^{-1}$. Ultraviolet spectrum: $\lambda_{max}$ 230 mμ ($\epsilon$=11250) and 297 mμ ($\epsilon$=5870).

What is claimed is:

1. Process for the preparation of 3-hydroxy-4-formyl-$\Delta^{1,3,5(10)}$-oestratrienes wherein a 3-oxo-4-lower alkanoyloxy-methylene-$\Delta^{5(10)}$-19-nor-steroid of the androstane, pregnane, cholane and cholestane series having the partial formula

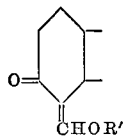

in which R' represents a lower alkanecarboxylic acid radical, is treated with a dehydrating agent.

2. Process as claimed in claim 1, wherein air is used as dehydrating agent.

3. Process according to claim 1, wherein 3-oxo-4-lower alkanoyloxy-methylene-$\Delta^{5(10)}$-19-nor-steroids of the formula

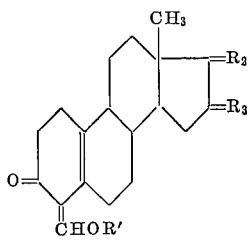

are used as starting materials, in which R' is a lower alkanecarboxylic acid radical, $R_2$ represents a member selected from the group consisting of an oxo group and a free, an esterified and an etherified β-positioned hydroxyl group together with a hydrogen atom or a lower aliphatic hydrocarbon radical, and $R_3$ stands for a member selected from the group consisting of two hydrogen atoms and a hydrogen atom together with a lower alkyl radical or a free, esterified or etherified hydroxyl group and a methylene group, each of said esterified hydroxyl groups being derived from a carboxylic acid having 1 to 15 carbon atoms and each of said etherified hydroxyl groups being lower alkyl, tetrahydropyranyl, tetrahydrofuranyl or cyclopentyl ethers.

4. Process according to claim 1, wherein 3-oxo-4-lower alkanoyloxy-methylene-$\Delta^{5(10)}$-19-nor-steroids of the formula

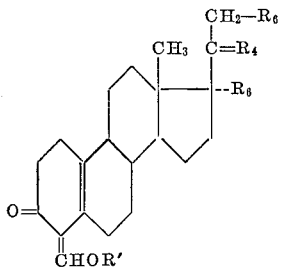

are used as starting materials, in which R' is a lower alkanecarboxylic acid radical $R_4$ represents a member selected from the group consisting of a free and a ketalized oxo group together with a free, an esterified and an etherified hydroxyl group, $R_5$ and $R_6$ each stand for a member selected from the group consisting of a hydrogen atom and a free, an esterified and an etherified hydroxyl group, or $R_4$, $R_5$ and $R_6$ together represent a bis-alkylene-dioxy group, each of said esterified hydroxyl groups being derived from a carboxylic acid having 1 to 15 carbon atoms and each of said etherified hydroxyl groups being lower alkyl, tetrahydropyranyl, tetrahydrofuranyl or cyclopentyl ethers.

5. Process according to claim 1, wherein 3-oxo-4-acetoxy-methylene-17β-acetoxy-$\Delta^{5(10)}$-19-nor-androstene is used as starting material.

6. 3-hydroxy-4-formyl-$\Delta^{1,3,5(10)}$-oestratrienes having the formula

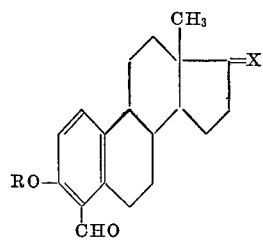

in which RO is a member selected from the group consisting of a free, an esterified and an etherified hydroxyl group and X represents a member selected from the group consisting of an oxo group and a free, an esterified and an etherified β-positioned hydroxyl group together with a hydrogen atom or a lower aliphatic hydrocarbon radical, each of said esterified hydroxyl groups being derived from a carboxylic acid having 1–15 carbon atoms and each of said etherified hydroxyl groups being lower alkyl, tetrahydropyranyl, tetrahydrofuranyl or cyclopentyl ethers.

7. 3-hydroxy-4-formyl-$\Delta^{1,3,5(10)}$-oestratrienes having the formula

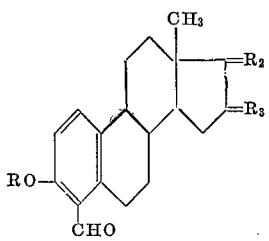

in which RO is a member selected from the group consisting of a free, an esterified and an etherified hydroxyl group, $R_2$ represents a member selected from the group consisting of an oxo group and a free, an esterified and an etherified β-positioned hydroxyl group together with a hydrogen atom or a lower aliphatic hydrocarbon radical, and $R_3$ stands for a member selected from the group consisting of two hydrogen atoms, a hydrogen atom together with a lower alkyl radical and a free, an esterified and an etherified hydroxyl group and for a methylene group, each of said esterified hydroxyl groups being derived from a carboxylic acid having 1–15 carbon atoms and each of said etherified hydroxyl groups being lower alkyl, tetrahydropyranyl, tetrahydrofuranyl or cyclopentyl ethers.

8. 3-hydroxy-4-formyl-$\Delta^{1,3,5(10)}$-oestratrienes having the formula

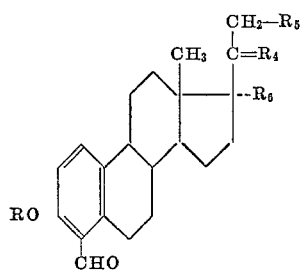

in which RO is a member selected from the group consisting of a free, an esterified and an etherified hydroxyl group, $R_4$ represents a member selected from the group consisting of a free and a ketalized oxo group and a hydrogen atom together with a free, an esterified and an etherified hydroxyl group, $R_5$ and $R_6$ each stand for a member selected from the group consisting of a hydrogen atom and a free, an etherified and an esterified hydroxyl group or $R_4$, $R_5$ and $R_6$ together represent a bis-alkylenedioxy group, each of said esterified hydroxyl groups being derived from a carboxylic acid having 1 to 15 carbon atoms and each of said etherified hydroxyl groups being lower alkyl, tetrahydropyranyl, tetrahydrofuranyl or cyclopentyl ethers.

9. A compound of the formula shown in claim 8, wherein R is hydrogen, $R_2$ is the acetoxy group together with a hydrogen atom and $R_3$ stands for two hydrogen atoms.

No references cited.

ELBERT L. ROBERTS, Primary Examiner

U.S. Cl. X.R.

195—51; 260—239.55, 239.57, 397.2, 397.47, 999

CASE 5868/E

UNITED STATES PATENT OFFICE
CERTIFICATE OF CORRECTION

Patent No. 3,483,235  Dated December 9, 1969

Inventor(s) OSKAR JEGER ET AL

It is certified that error appears in the above-identified patent and that said Letters Patent are hereby corrected as shown below:

Column 5, lines 64 to 67, the right hand side of the formula should read:

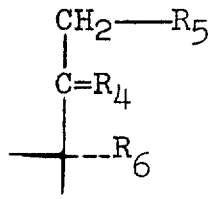

Column 7, lines 9 to 13, the left hand side of the formula should read:

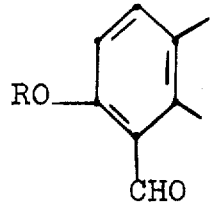

Column 8, line 9, change "claim 8" to read --- claim 7 ---.

SIGNED AND SEALED
MAR 16 1971

(SEAL)
Attest:

Edward M. Fletcher, Jr.
Attesting Officer

WILLIAM E. SCHUYLER, JR.
Commissioner of Patents